United States Patent [19] [11] 4,271,934
Gagnon et al. [45] Jun. 9, 1981

[54] BRAKE

[76] Inventors: Pierre Gagnon, 5637 Wilderton Ave., Montreal, Canada, H3T 1S1; Pierre Laforest, 1945 De Bruxelles St., Montreal, Canada, H1L 5Z5

[21] Appl. No.: 74,110
[22] Filed: Sep. 10, 1979
[51] Int. Cl.³ .............................................. F16D 65/24
[52] U.S. Cl. .................................................. 188/170
[58] Field of Search ................... 188/170, 71.5, 72.3, 188/216

[56] References Cited
U.S. PATENT DOCUMENTS
3,599,760 8/1971 Moss ..................................... 188/170
4,077,500 3/1978 Hickman, Sr. et al. ......... 188/170 X Primary Examiner—Douglas C. Butler

[57] ABSTRACT

There is disclosed a disc brake for a fluid-operated motor; the brake includes a disc keyed to the output shaft of the motor and sandwiched between non-rotatable plates which are spring-biased to disc braking position. The flexible conduit, which feeds the fluid to the motor, extends between the two plates. When fluid in the conduit is not pressurized, the conduit is flattened and the brake is in braking position, but the brake is released as soon as the fluid is pressurized within the conduit, since the latter takes its normally cylindrical shape and separates the two plates.

11 Claims, 4 Drawing Figures

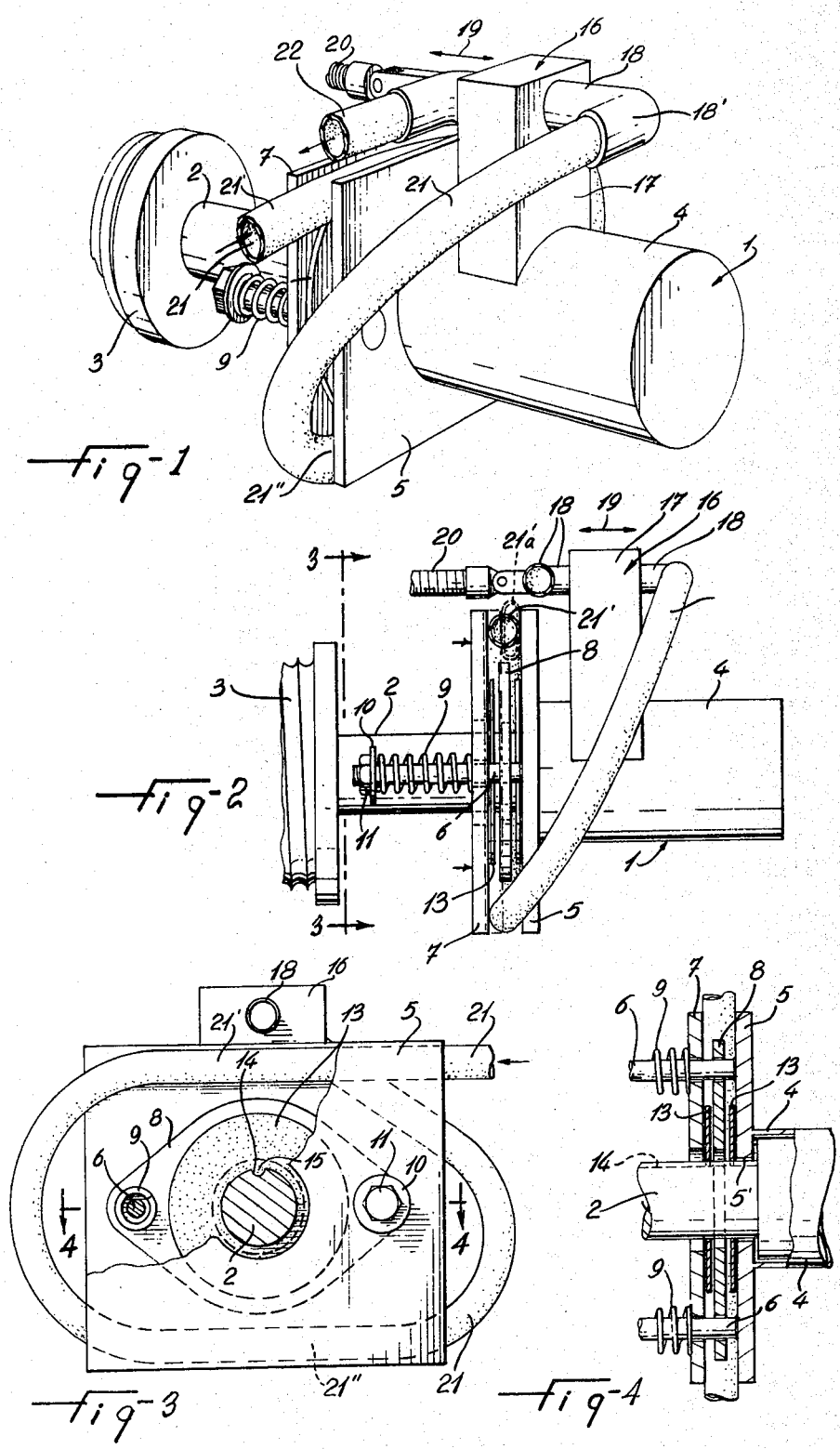

BRAKE

FIELD OF THE INVENTION

The present invention relates to braking devices and more particularly to a braking device for a fluid operated motor such as a hydraulic or compressed air motor.

BACKGROUND OF THE INVENTION

Motors which are connected to a heavy load generally require a safety braking system to stop the load, whether it be moving in a linear or rotational mode, in the event that the pressurized feeding fluid fails to reach the motor for a variety of reasons. Till now, all such braking systems were operated independently of the motor itself and sometimes required an independent power source, as for electromagnetic brakes.

OBJECTS OF THE INVENTION

Accordingly, it is a prime object of the present invention to provide a brake system for a motor powered by a pressurized medium which becomes operational the moment the pressurized fluid no longer reaches the motor.

It is another object of the present invention to provide a brake for the motor described above which is immediately disengaged from the load the moment the pressurized fluid reaches the motor.

It is yet another object of the present invention to provide a brake for a fluid operated motor described above which advantageously uses the same power source as the motor.

It is yet another object of the present invention to provide a brake of the type described above which is very simple in design.

SUMMARY OF THE INVENTION

The brake in accordance with the invention comprises a brake member connected to the output shaft of a fluid-operated motor having a flexible conduit connected thereto for feeding pressurized motive fluid to said motor, a brake shoe movable between a first position in braking engagement with said brake member, and a second position releasing said brake member, spring means biasing said brake shoe to said first position, said flexible conduit having a portion sandwiched between a reaction surface and said brake shoe and causing movement of said brake shoe from said first to said second position against the bias of said spring means when pressurized fluid is present in said conduit portion and allowing movement of said brake shoe from said second to said first position under the action of said spring means under the bias of said spring means when no pressurized fluid is present in said conduit portion.

In accordance with a preferred embodiment of the invention, the brake member is a brake disc keyed to the output shaft for axial movement thereon. The reaction surface is a plate secured to the motor housing and freely surrounding the output shaft. Guide rods are secured to said reaction plate and extend parallel to the output shaft exteriorly of the brake disc through holes made in the brake shoe, which is a brake shoe plate mounted parallel to the reaction plate, the brake disc being located between the two plates, and said spring means are coil springs surrounding said rods and having one end retained to the rods and the other end pressed against the brake shoe plate. The flexible conduit has a normally cylindrical shape but can be flattened. It is sandwiched between the two plates at two diametrically opposite zones relative to the output shaft to balance the separating force exerted by the conduit on the plates.

The flexible conduit is preferably connected to the motor through the intermediary of a control valve such as a spool valve having a neutral position, a forward position and a reverse position.

The above will be more clearly understood by referral to a preferred embodiment of the invention illustrated by way of the accompanying drawings in which:

BRIEF DESCRIPTION OF THE DRAWINGS

FIG. 1 is a perspective view of a fluid operated motor and brake system according to the invention;

FIG. 2 is a side elevation of the brake system and motor according to the invention;

FIG. 3 is a cross section taken along line 3—3 of FIG. 2; and

FIG. 4 is a plan section taken along line 4—4 of FIG. 3.

Like numerals refer to like elements throughout the drawings.

DETAILED DESCRIPTION OF THE INVENTION

The invention includes a fluid operated reversible motor 1, such as a hydraulic motor, having an output shaft 2 which is connected to a suitable load. The load suggested in FIGS. 1 and 2 is a drum 3 for winding a cable to which scenery is attached. The motor has a housing 4. Rigidly secured to the output shaft end of housing 4 is a flat, transverse rectangular plate 5 which is stationarily mounted by means (not shown) and which has a hole 5' in its center through which freely passes output shaft 2.

On either side of output shaft 2 a guide rod 6 is rigidly secured to flat plate 5 and projects forwardly, parallel to output shaft 2. A second flat transverse plate 7 dimensionally identical to flat plate 5 is slidably mounted on the two rods 6 in parallel spaced-apart relationship to flat plate 5. A third, middle plate 8 generally oval in configuration and having two lateral ears is also slidably mounted on the two rods 6 and is located in parallel spaced-apart relationship between the first flat plate 5 and the second flat plate 7. Plates 5, 7 and 8 extend transversely of and freely surround output shaft 2.

Each rod 6 is provided with a biasing means pushing the second flat plate 7 towards the first flat plate 5 and consisting of a compression coil spring 9 abutting the outer surface of flat plate 7 at its rearward end and abutting a washer 10 at its forward end. The forward end of each rod 6 is threaded to receive a nut 11 retaining washer 10 and by which the compression of coil spring 9 may be adjusted.

Two identical brake discs 13, preferably made of steel, are mounted for rotation with and for axial movement relative to the output shaft 2 by means of a keyway 14 in the output shaft 2 and a corresponding key protuberance 15 on each disc 13. The brake discs 13 are in parallel spaced-apart relationship with one being located between the first transverse plate 5 and the middle plate 8, and the other disc 13 being located between the middle plate 8 and the second flat transverse plate 7. Guide rods 13 extend on the outside of discs 13.

The motor 1 is provided with a spool valve 16 having a valve block 17 secured to motor housing 4 and having two ports (not shown) in direct communication with the two ports of housing 4. A tubular spool 18 slidably extends through the valve block 17 and is movable in accordance with double arrow 19 under the action of a control rod 20, to take a central position corresponding to blocking of the two ports of the motor housing 4 and two limit positions corresponding to forward and reverse rotation of the output shaft 2 by chanelling the flow of the pressurized fluid through appropriate passages in the spool and in the valve block. The spool valve 16 forms no part of the present invention and could be replaced by any other type of spool valve or on-off control valve in the case of a non reversible motor. A flexible conduit 21 for feeding fluid under pressure is connected to elbow 18' of spool 18. Conduit 21 is a conventional hose for carrying a fluid under pressure. It normally has a cylindrical shape but can be flattened. A similar hose 22 is connected to elbow 18" of spool 18 and serves for the return of the fluid to the pump sump (not shown).

In accordance with the invention, input or feeding conduit 21 has portions 21' and 21" which are sandwiched between plates 5 and 7. Portion 21' extends adjacent the top edges of plates 5 and 7. Then feeding conduit 21 curves downwardly around one lateral side of plates 5 and 7 and then portion 21" passes between the latter adjacent their bottom edges and finally conduit 21 curves upwardly to connect to elbow 18' of spool 18. Portions 21' and 21" are located at diametrically zones of plates 5 and 7 relative to output shaft 2 to balance the separating forces exerted by said portions on plates 5 and 7. It is to be noted that input hose 21 is made of flexible material so that it is flattened as shown at 21'a by plates 5 and 7 under the bias of springs 9 when there is no pressure within hose 17.

The principle of operation of the brake disclosed by the invention is very simple. When no pressurized fluid is present in input conduit 21, portions 21' and 21" are flattened by plates 5 and 7. The latter together with plate 8 take a braking position in frictional contact with brake discs 13 to brake the load. When pressurized fluid is present in input conduit 21, portions 21' and 21" swell to take their normal cylindrical shape causing separation of plates 5 and 7 and release of the disc brake assembly against the bias of springs 9. The shaft 2 is then free to rotate. The compression springs 9 can be adjusted to suit the load to be stopped. Naturally, the number of brake discs 13 and interdigitated brake shoes 8 can be varied in accordance with the load.

In the embodiment shown, plate 5 forms a reaction surface for conduit portions 21' and 21". Also, both plates 5 and 7 form brake shoes since brake discs 13 are axially movable on shaft 2. However, for small loads, a single disc 13 could be fixed to shaft 2 and engaged only by brake shoe plate 7.

The principle of the invention is applicable to a braking system including a brake drum and movable brake shoes surrounding the brake drum. The conduit 21 would then extend between a reaction surface and the brake shoes.

In accordance with the invention, whenever the pump feeding the motor 1 is stopped, or if input conduit 21 springs a large enough leak, the brake becomes immediately operational.

What we claim is:

1. A brake for braking a load connected to the output shaft of a fluid-operated motor having a flexible conduit connected thereto for feeding pressurized motive fluid to said motor, said brake comprising a brake member mounted on said output shaft for rotation therewith, a brake shoe movable between a first position in braking engagement with said brake member, and a second position releasing said brake member, spring means biasing said brake shoe to said first position, said flexible conduit having a portion sandwiched between a reaction surface and said brake shoe and causing movement of said brake shoe from said first to said second position when pressurized fluid is present in said conduit portion and allowing movement of said brake shoe from said second to said first position under the bias of said spring means when no pressurized fluid is present in said conduit protion.

2. A brake as claimed in claim 1, wherein said brake member is a brake disc, said brake shoe is a first plate freely surrounding said output shaft and mounted for movement axially of said output shaft, and said reaction surface is a second plate freely surrounding said output shaft and stationarily mounted substantially parallel to, and spaced from, said first plate, said brake disc and said first and second plates extending transversely of said output shaft.

3. A brake as claimed in claim 2, further including guide rods secured to said second plate, extending on the outside of said brake disc and longitudinally of said output shaft, said first plate slidable on said guide rods, said spring means comprising compression springs surrounding said guide rods, retained at one end on said guide rods and bearing at the other end against said first plate.

4. A brake as claimed in claim 3, wherein said brake disc is axially movable on said output shaft and said second plate constitutes a second brake shoe engageable with said brake disc.

5. A brake as claimed in claim 4, including at least a third brake shoe consisting of a third plate slidable on said guide rods and located between said first and second plates, said brake disc being located between said first and third plates and further including a second brake disc disposed between said second and third brake plates, said second brake disc being mountd on said output shaft for rotation therewith and for axial movement thereon.

6. A brake as claimed in claims 3, 4 or 5, wherein said second plate is fixed to the housing of said motor.

7. A brake as claimed in claims 1, 2 or 3, wherein said flexible conduit is connected to said motor through the intermediary of a control valve for feeding and shutting off pressurized fluid to said motor and said conduit portion is upstream of said control valve.

8. A brake as claimed in claims 2, 3 or 4, wherein said conduit portion is sandwiched between said first and second plates in zones located outside said brake disc and diametrically opposite said output shaft.

9. A brake as claimed in claims 1, 2 or 3, wherein the biasing force exerted by said spring means is adjustable.

10. A brake as claimed in claims 1, 2 or 3, wherein said flexible conduit is connected to said motor through the intermediary of a spool valve having a neutral position, a forward position and a reverse position, and said conduit portion is upstream of said spool valve.

11. A brake for braking the output shaft of a fluid-operated motor having a flexible normally cylindrical conduit feeding pressurized fluid to said motor for its operation, said brake comprising a brake disc mounted on said output shaft and rotatable therewith, a pair of brake plates freely surrounding said output shaft on each side of said brake disc, means to prevent rotation of said plates, but allowing displacement of at least one plate axially of said shaft, spring means urging said one plate to a braking position frictionally engaging said brake disc and braking said output shaft, and said flexible conduit having a portion engaged between said plates and allowing said one plate to take its braking position under the bias of said spring means when said conduit portion is flattened by said spring means, due to absence of fluid under pressure in said conduit portion, and causing sufficient separation of said plates against the bias of said spring means when said conduit portion takes a cylindrical shape due to the action of fluid under pressure therein.

* * * * *